(12) United States Patent
Keller

(10) Patent No.: US 6,705,656 B2
(45) Date of Patent: Mar. 16, 2004

(54) PULL-OUT LOAD PLATFORM FOR TRUCK CARGO BEDS

(76) Inventor: Cyril N. Keller, 1802 Connell Dr., Fergus Falls, MN (US) 56537

(*) Notice: Subject to any disclaimer, the term of this patent is extended or adjusted under 35 U.S.C. 154(b) by 0 days.

(21) Appl. No.: 10/061,563

(22) Filed: Feb. 1, 2002

(65) Prior Publication Data

US 2003/0146636 A1 Aug. 7, 2003

(51) Int. Cl.⁷ .............................................. B62D 33/08
(52) U.S. Cl. ...................... 296/26.09; 224/402; 224/403
(58) Field of Search .......................... 296/26.08, 26.09, 296/37.6; 224/401, 402, 403; 414/522

(56) References Cited

U.S. PATENT DOCUMENTS

| | | | |
|---|---|---|---|
| 4,681,360 A | * 7/1987 | Peters et al. ................ 296/37.6 |
| 4,993,088 A | 2/1991 | Chudik |
| 5,052,878 A | * 10/1991 | Brockhaus ................. 296/37.6 |
| 5,118,156 A | 6/1992 | Richard |
| 5,513,941 A | 5/1996 | Kulas et al. |
| 5,544,998 A | * 8/1996 | Malinowski .............. 296/26.09 |
| 5,564,767 A | * 10/1996 | Strepek .................... 296/26.09 |
| 5,603,439 A | 2/1997 | Pineda |
| 5,649,731 A | 7/1997 | Tognetti |
| 5,685,467 A | * 11/1997 | Niemi et al. ................. 224/542 |
| 5,788,307 A | * 8/1998 | Gilbert ......................... 296/32 |
| 5,820,190 A | * 10/1998 | Benner ..................... 296/26.09 |
| 5,845,953 A | 12/1998 | Rusnock |
| 5,897,138 A | 4/1999 | Hall |
| 5,915,773 A | 6/1999 | Deutsch et al. |
| 5,931,632 A | * 8/1999 | Dongilli et al. ............. 296/37.6 |
| 5,934,725 A | * 8/1999 | Bowers .................... 296/26.09 |
| 5,938,262 A | * 8/1999 | Mills ........................ 296/26.09 |
| 5,944,371 A | * 8/1999 | Steiner et al. ........... 296/26.09 |
| 5,988,722 A | * 11/1999 | Parri ........................ 296/26.09 |
| 6,059,339 A | 5/2000 | Madson |
| 6,065,792 A | * 5/2000 | Sciullo et al. ........... 296/26.09 |
| 6,120,075 A | * 9/2000 | Terry ....................... 296/26.09 |
| 6,186,575 B1 | * 2/2001 | Fisher et al. ............. 296/26.09 |
| 6,312,034 B1 | 11/2001 | Coleman, II et al. |
| 6,325,439 B1 | * 12/2001 | Crossman .................. 296/37.6 |
| 6,328,364 B1 | * 12/2001 | Darbishire ............... 296/26.09 |
| 6,390,525 B2 | * 5/2002 | Carpenter et al. ........ 296/26.09 |
| 6,398,283 B1 | * 6/2002 | Knudtson et al. ........ 296/26.09 |
| 2002/0180231 A1 | * 12/2002 | Fox ..................... 296/26.09 X |

* cited by examiner

Primary Examiner—D. Glenn Dayoan
Assistant Examiner—Lori L Coletta
(74) Attorney, Agent, or Firm—Moore, Hansen & Sumner (57) ABSTRACT

A pull-out load platform truck cargo beds. The load platform has a frame with a base, a plurality of outriggers that extend therefrom, and a pair of rails that are aligned with the base. The outriggers and the rails are adjustable and have ends that are configured and arranged to engage surfaces of a truck body in a non-invasive manner, so that when the load platform is installed in a cargo bed of a truck, the base is prevented from moving relative thereto. A deck, onto which cargo may be placed, is operatively connected to the frame and movable relative thereto, preferably in a constrained manner. When the deck is pulled out relative to the frame so that it extends partially beyond the end of the base in a cantilever fashion, the deck is prevented from tipping by the operative connection between the frame and the deck.

30 Claims, 5 Drawing Sheets

PULL-OUT LOAD PLATFORM FOR TRUCK CARGO BEDS

FIELD OF THE INVENTION

BACKGROUND OF THE INVENTION

This invention relates generally to aftermarket truck accessories. More particularly, the present invention relates to a pull-out load platform for truck cargo beds.

The popularity of pickup trucks in today's society is undeniable. From rather humble beginnings, they have evolved from a simple, basic, transporter into a sophisticated, stylish and powerful vehicle. Yet, the sine qua non that defines a pickup truck has not changed appreciably over the years. This essential element is the cargo bed.

Generally, the safest area in which to place an item of cargo is towards the front and center of the cargo bed, adjacent the cab of a truck. Unfortunately, this location is also the most difficult to reach. Unloading and loading can be a problem, especially when the items of cargo are heavy and hard to grip. Either a person must try to retrieve an item of cargo from the sides of the cargo box, or the person must get into the cargo box to retrieve the item. Loading is somewhat simpler in that an item may be tossed to the desired location, or slid or rolled along the cargo bed towards the cab end of a cargo box.

This unloading and loading can become even more problematic if the truck has been equipped with a protective cap such as a topper or a tonneau cover. These protective caps preclude access from the sides of the cargo box and a user is forced to load or unload an item into the dark confines of the enclosed cargo box from an open tailgate. This limited access means that placing or retrieving an item adjacent the front end of the cargo bed requires that a person engage in a certain amount of gymnastics. That is, either a person must contort oneself in unnatural positions to retrieve or store items in the far reaches of a cargo box, or the person must clamber or crawl into the confined space of the enclosed cargo box to retrieve or store items.

Over the years, various devices have been developed to assist a person in loading and/or unloading a truck cargo box. These devices generally feature a movable bed or platform that can be extended or retracted relative to a cargo bed of a truck. These devices fall into two camps, those in which a frame with attached or integral rails supports the platform (See, for example, U.S. Pat. Nos. 5,513,941; 5,820,190; and 6,059,339), and those in which rails alone support the platform (See, for example, U.S. Pat. Nos. 4,993,088; 5,649,731; 5,915,773; and 5,938,262). While the aforementioned devices feature a movable platform or bed that is able to extend and retract relative to a cargo bed of a truck, they all suffer from the same drawback in that they are installed on the truck as a permanent or semi-permanent structure. That is, either the support frame or the support rails are physically attached to a truck bed in some invasive manner. For example, by drilling holes in the cargo bed or box for attachment bolts.

A related drawback to this type of installation is that tools are required to locate and drill attachment holes, and to attach bolts and nuts. And, in the case of separate rail supports, pains must be taken to carefully align and center the rails along the cargo bed, because if the rails are not aligned correctly the platform will fail to operate as intended. As one may appreciate, this takes time and a considerable amount of expertise. Another related drawback to this type of installation is that such modifications expose bare metal to the environment, which promotes rusting.

Another drawback with this type of installation is that even if the platform is removed, the support frame or support rails remain attached to the cargo bed, and a user may be precluded from utilizing the full extent of the cargo bed because of the support frame or support rails that project upwardly therefrom.

Yet another drawback with the aforementioned devices is that the operative connections between the rails and the platform are relatively weak, and they are not capable of resisting large moment arms that are created when the platform is partially extended beyond the tailgate or loading end of a cargo bed.

Still another drawback is that the platforms are smaller than the cargo beds in which they are installed so that they can accommodate inwardly protruding wheel wells. This means that items can fall off the edges of the platform and become lost or damaged.

There is a need for a pull-out load platform for truck cargo beds that may be installed in a variety of differently sized cargo beds in a non-invasive manner. There is also a need for a pull-out load platform with a deck may be extended and/or retracted relative to the cargo box of a vehicle to facilitate loading or unloading of cargo. There is also a need for a pull-out load platform that may be secured in one of several positions relative to the cargo bed of a truck and which is able to resist tipping as a portion of the deck is extended beyond the tailgate (or loading end) of a cargo bed. And there is also a need for a pull-out load platform that includes a deck with structure configured to prevent loads from accidentally shifting over edges of the deck.

BRIEF SUMMARY OF THE INVENTION

The present invention is a load platform for use with a truck having a cargo bed. The load platform has a frame that may be operatively connected to a truck, and a deck that may be operatively connected to the frame. The frame is adjustable so that it may be used with differently sized cargo beds, and includes a base, a plurality of outriggers that extend therefrom, and a pair of rails that are attached to the outriggers. The base is configured to support and guide the deck as it moves relative thereto and may comprise one or more tracks. Preferably, when the frame is installed in a cargo box of a truck, the base of the frame is oriented so that it is generally perpendicular to the tailgate or a loading end of the truck.

The outriggers are adjustable (in two dimensions of a three dimensional coordinate system) and have ends with brackets that are configured and arranged to engage, in a non-invasive manner, the containment walls that extend around the cargo bed of a truck. In use, a load platform with the outriggers of its frame retracted is positioned on the cargo bed of a truck. The outriggers are then extended so that their ends (with their respective brackets) are brought into engagement with the walls that extend around the cargo bed. Preferably, the brackets are adjustable and may be positioned so that they may be brought into engagement with the inwardly extending, horizontal ledges formed in the sidewalls of truck cargo beds. More preferably, the brackets may be positioned so that they extend into the inverted channels formed by the inwardly extending, horizontal ledges and the sidewalls formed in truck cargo beds. Once the outriggers and their respective brackets are engaged and locked, the frame of the load platform is now prevented from shifting from side-to-side (laterally) and up-and-down (vertically) with respect to the cargo bed of a truck.

Each rail of the frame is attached adjacent the outwardly extending ends of pairs of outriggers so that they are in alignment with the track(s) of the base, and with each other. As with the outriggers, the rails are adjustable (in a third dimension of a three dimensional coordinate system) to enable the frame to be used with differently sized cargo beds. To that end, the rails are provided with forward and rearward stops that are configured and arranged to engage the walls that extend around the cargo bed of a truck. Preferably, the forward and rearward stops engage the forward wall, and the closed tailgate or other rearward structure of a truck, respectively. More preferably, the rearward stops are adjustable and they engage the surface of a closed tailgate of a truck. Once the rails and their respective stops engage the walls that extend around the cargo bed of a truck and locked, the frame of the load platform is now prevented from shifting from front to back (longitudinally) with respect to the cargo bed of a truck. It will be appreciated, then, that when the outriggers and rails of the frame have been brought into locked engagement with the containment walls that extend around the cargo bed of a truck, the base is secured to the cargo bed of a truck in a non-invasive manner, and is prevented from accidentally shifting or moving relative thereto. Optionally, the engagement members and the stops of the outriggers and rails may be provided with resilient covers or coatings to further protect the surfaces of the truck from damage.

The deck of the load platform is movable with respect to the frame, and is designed so that a portion of it may be extended, in a cantilever fashion, beyond the tailgate or loading end of a truck. In order to facilitate the cantilever extension and prevent tipping of the deck as it is extended, the deck operatively engages the frame as it moves relative thereto. This is accomplished by providing the front or forward end of the deck with a pair of posts or stanchions that support a crossbar having opposing ends. Each end of the crossbar has an adjustable arm whose end terminates in rail contacting member. Preferably, the rail contacting member comprises an upwardly facing roller. In operation, the rail contacting members engage the bottom surfaces of the rails as they move with respect thereto, and in so doing, they counteract the moment arm created when the deck is in its extended, cantilever (or access) position.

In order to facilitate movement and control during operation, the bottom surface of the deck is provided with a plurality of rollers that ride along the base of the frame. Preferably, the rollers engage tracks on the base as the deck moves therealong. More preferably, the rollers travel along upwardly facing channels in the tracks, which serve to control the direction of motion of the deck. In order to prevent overextension of the deck relative to the frame, the frame is provided with one or more upwardly extending stops that are configured to engage the deck. The deck may also be provided with a latch that operatively engages the frame so that the deck may be secured in one of several positions relative to the frame and base.

An object of the present invention is to provide a load platform that may be installed in a variety of differently sized truck cargo beds.

Another object of the invention is to simplify installation of a load platform in a truck cargo bed.

Still another object of the invention is to eliminate the need to modify or alter cargo bed surfaces during instillation of the load platform.

A feature of the present invention is that the load platform includes adjustable outriggers and rails that are configured and arranged to engage, in a non-invasive manner, the surfaces of a truck body.

Another feature of the invention is that the deck of the load platform is operatively connected to a truck cargo bed through a frame.

Yet another feature of the present invention is that the deck of the pull-out platform may be selectively secured to the frame in one of several positions.

Still another feature of the invention is that the deck includes structure configured to prevent loads from accidentally shifting over edges of the deck.

An advantage of the present invention is that the load platform may be installed quickly and without the need of any tools.

Another advantage of the invention is that the load platform may be completely removed from a cargo bed, leaving the cargo bed free from any intrusive or extraneous frame components or attachments.

Yet another advantage is that the potential for rust and oxidation to occur at attachment points is minimized.

Additional objects, advantages and features of the invention will be set forth in part in the description which follows, and in part will become apparent to those skilled in the art upon examination of the following or may be learned by practice of the invention. The objects and advantages of the invention may be realized and attained by means of the instrumentalities and combination particularly pointed out in the appended claims.

DESCRIPTION OF THE PREFERRED EMBODIMENTS

Figure 1:
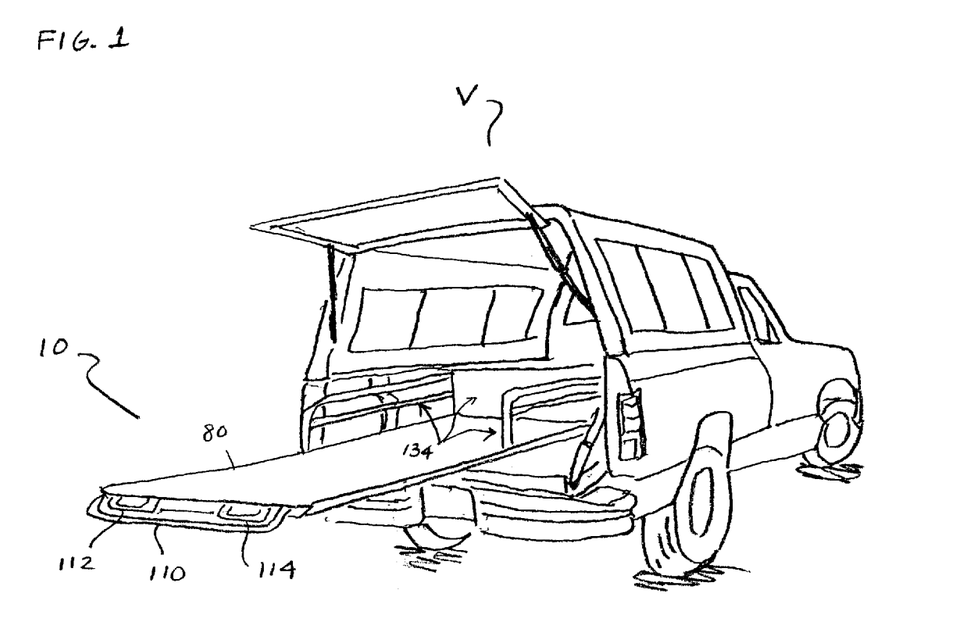
FIG. 1 is a perspective view of a preferred embodiment of the pull-out load platform of the invention that has been installed in the cargo bed of a truck and its deck is in an extended, cantilever position.

Referring to FIG. 1, a preferred embodiment of the pull-out load platform 10 of the present invention is depicted as it may be used in conjunction with a cargo bed of a vehicle V such as a pickup truck. As shown, a load platform 10 has been installed in the vehicle 10 and the deck 80 has been extended so that its rear end is cantilevered relative to the support structure of the load platform 10, and to the cargo bed and tailgate of the truck. In this extended or access position, cargo that would normally be located near or at the front end of the cargo bed is now located within arm's reach. Thus, a user may load or unload cargo with relative ease, and reduce the of risk injury due to overextension or by crawling into the cargo space. Note that the deck 80 of the load platform 10 is sized so that it has a smaller footprint than the cargo bed of a truck, which enables the tailgate or other closure to operate in a normal fashion.

The deck 80 may be provided with structure 134 (for example, frames or walls), which prevents unsecured cargo from accidentally shifting over its edges. Preferably, the structure 134 comprises opposing side frames 136a, 136b and an end wall 138. Note that cargo straps or load restraints (not shown) may be used in conjunction with the side frames 136a, 136b and end wall 138 so that cargo may be secured to the deck 80. It will be appreciated that the structure 134 need not be only side frames and an end wall. The structure may comprise any combination of frames and walls desired; for instance, side walls and an end wall, or side frames and an end frame.

Figure 2:
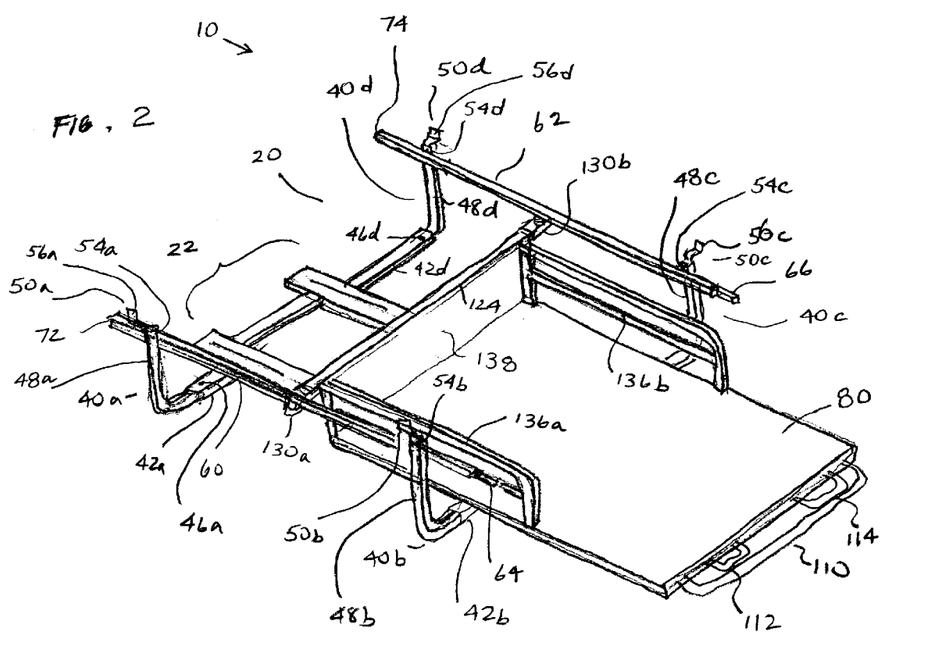
FIG. 2 is a perspective view of the load platform of FIG. 2 in which the deck has been partially extended relative to the frame.
Figure 3:
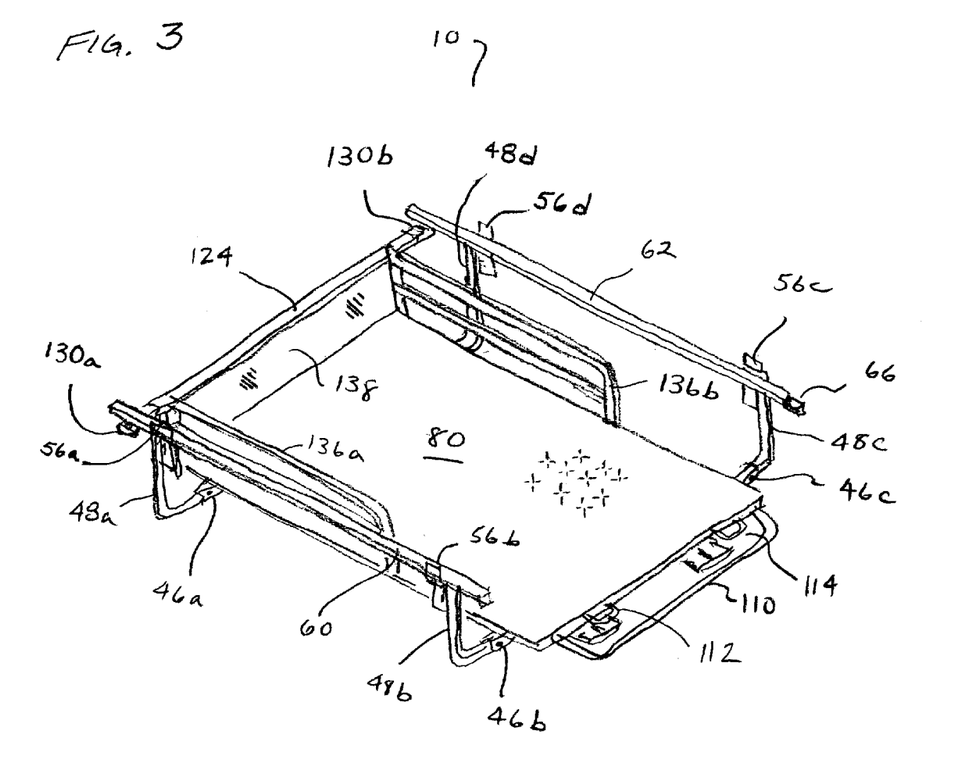
FIG. 3 is perspective view of a preferred embodiment of load platform in which the deck is super positioned over the frame.

FIGS. 2 and 3 depict a load platform, as it may appear when it is in access (or extended) and transport (or retracted) positions, respectively. Referring now to FIG. 2, the load platform 10 comprises a frame 20 and a deck 80. As depicted, the frame 20 includes a base 22 that supports the deck 80 as it moves relative thereto. As depicted, the deck 80 has been displaced relative to the frame 20 so that its rear end extends beyond the frame 20 in a cantilever relation. The rear end of the deck 80 is prevented from tipping downwardly relative to the frame 20 by a crossbar 124 that is located adjacent the front end of the deck 80 and which operatively engages the frame 20 via parallel side rails 60, 62.

Referring now to FIG. 3, the deck 80 of the load platform 10 has been manipulated so that it now overlies the base 22 of the frame 20. In this position, the deck 80 is more-or-less coincident with the base 22 of the frame 20, and in this regard, the figure is a representation of the platform in its transport (or retracted) position.

Figure 4:
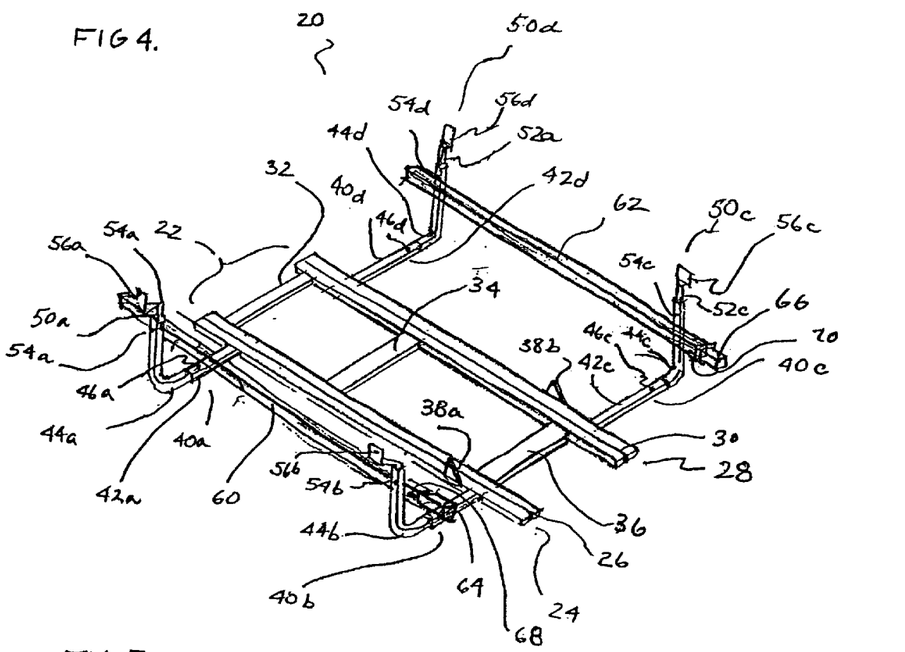
FIG. 4 is a perspective view of the frame of the load platform of FIG. 2.

Referring now to FIG. 4, the frame 20 of the load platform 10 will now be discussed. As shown, the frame 20 comprises a base 22 that supports the deck as it moves thereabove. The base 22 may comprise one or more tracks 24, 28 that support the deck 80 as it moves thereover. Each track may be provided with one or more vertically extending walls that serve to guide the deck 80 as is moves between its transport and access positions. At least one, and preferably both of the tracks 24, 28 each include two vertically extending walls that form parallel channels 26, 30, respectively, which receive rollers 94 carried by the deck 80 (see, FIGS. 5 and 7). The tracks 24, 28 are spaced apart from and connected to each other by a plurality of tiebeams 32, 34, and 36.

As mentioned above, the frame 20 is adjustable to enable it to be installed in a variety of differently sized cargo beds. To that end, the frame 20 is provided with outriggers 40a, 40b, 40c, 40d, and rails 60, 62. Each outrigger includes an outwardly (or laterally) extending boom 42a, 42b, 42c, 42d, and an arm 44a, 44b, 44c, 44d that may be operatively connected thereto. The arms and booms may be secured relative to each other by a respective locking element 46a, 46b, 46c, 46d. Preferably, each arm 44a, 44b, 44c, 44d is constructed and arranged to be operatively connected to their respective boom 42a, 42b, 42c, 42d in a telescopic relation. Each arm 44a, 44b, 44c, 44d includes a mast 48a, 48b, 48c, 48d that is angled, in a generally vertical direction, with respect to the base 22.

A bracket 50a, 50b, 50c, 50d is operatively connected adjacent the upper end of each mast 48a, 48b, 48c, 48d. Preferably, each bracket 50a, 50b, 50c, 50d includes a post 52a, 52b, 52c, 52d that is constructed and arranged to be operatively connected to a respective mast 48a, 48b, 48c, 48d in a telescopic relation, and may be operatively connected thereto by a locking element 54a, 54b, 54c, 54d, respectively. Each bracket 50a, 50b, 50c, 50d also includes an engagement member 56a, 56b, 56c, 56d that is configured and arranged to contact, in a non-invasive manner, the containment walls of a cargo box so that the frame 20 may be operatively connected to a vehicle in a non-invasive manner. Each engagement member may be provided with a protective layer or cap of resilient material (not shown) to further protect the surface finish of the vehicle in which at the points contact.

An advantage to providing the frame 20 with outriggers 40a, 40b, 40c, 40d, is that it is not necessary to precisely align the base 22 of the frame 20 along the centerline of a cargo bed. That is, the base 22 may be off-center and the load platform 10 may still operate as designed. Although the outriggers 40a, 40b, 40c, and 40d of the frame 20 include four adjustable arms 44a, 44b, 44c, and 44d, it will be appreciated that not all of the arms need be adjustable for the frame to function as intended. For example, the arms on one side of the frame 20 could be fixed, and the arms on the opposite side could be adjustable.

As can be seen, the rails 60, 62 are attached adjacent the upper ends of pairs of masts 48a and 48b, 48c and 48d, respectively, in a bilateral and elevated relation to the base 22 of the frame 20. An advantage of placing the rails above the deck rather than under the deck is that the rails do not have any appreciable size constraints. Thus, the rails 60, 62 can be rather robustly configured, and it should be apparent, then, that the rails 60, 62 are better able to resist the tipping force (or moment arm) that is created when the deck 80 of the load platform 10 is in its extended or access position.

The rails 60, 62 of the frame 20 are also adjustable and in this regard, the ends of each rail 60, 62 are provided with stops 64 and 72, 66 and 74, that are configured to engage containment walls of a cargo box. Preferably, the stops 72, 74 located at the forward end of each rail 60, 62, respectively, are fixed and the stops 64, 66 located at the rearward end of each rail 60, 62, respectively, are adjustable. As with the outrigger construction, each rear stop 64, 66 is constructed and arranged to be operatively connected to a respective rail 60, 62 in a telescopic relation, and may be secured with a respective locking element 68, 70. Preferably, the adjustable stops 64, 66 engage the closed tailgate or closure door of a vehicle. However, it should be apparent that the adjustable stops may be configured and arranged to engage a containment wall of a cargo box, if desired. As with the engagement members the stops may be provided with a protective layer or cap of resilient material (not shown) to further protect the surface finish of the vehicle at the points of contact.

It will be appreciated that by attaching the rails 60, 62 to the outriggers 40,a, 40b, 40c, 40d of the frame 20, alignment thereof with respect to the base 22 is maintained. And, as mentioned above, the base 22 need not be precisely centered along the centerline of the cargo bed for the platform 10 to operate as designed. Thus, by adjusting the outriggers 40a, 40b, 40c, 40d and the rails 60, 62 of a frame 20, the base 22 of the frame 20 may be secured to the cargo bed of a vehicle. The frame 20 may also be provided with a pair of stops 38a, 38b, which are configured to engage the deck 80 and prevent overextension. Preferably, the stops 38a, 38b engage the forward beam 84 of the deck frame 82 (see, FIG. 5).

Figures 5, 6:
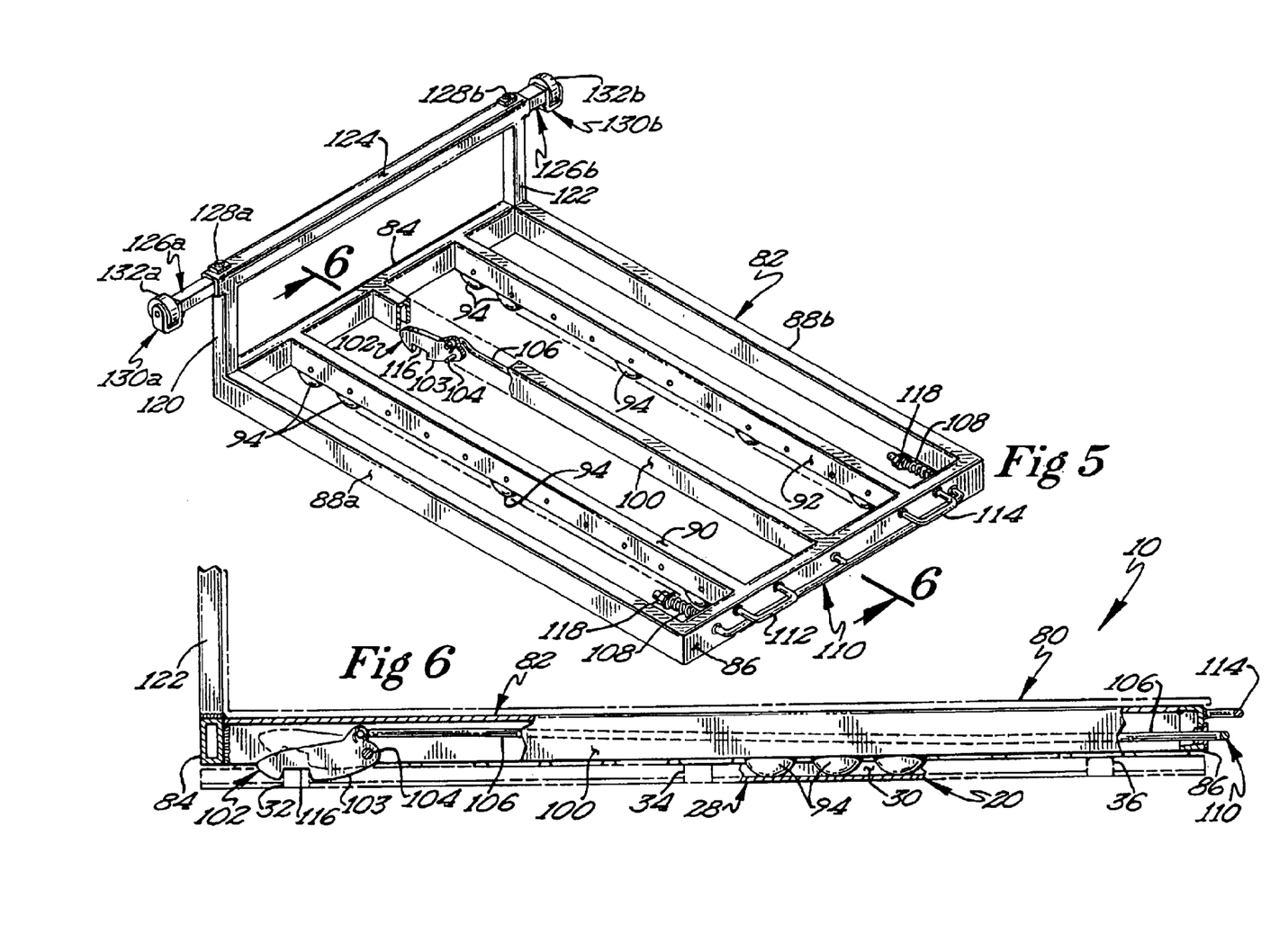
FIG. 5 is a partial, perspective view of the deck of the load platform of FIG. 2.
FIG. 6 is a partial cross-sectional plan view showing the latch that has engaged a tiebeam of the base of the frame.

Referring now to FIG. 5, the deck 80 (sans platform) is depicted. As can be seen, the deck 80 includes a frame 82 with a forward beam 84, a rearward beam 86, and a plurality of supports 88a, 88b, 90, 92, and 100 extending therebetween. The frame 82 also includes a pair of stanchions or posts 120, 122 that support a crossbar 124 having opposing ends. Each end of the crossbar 124 has an adjustable arm 126a, 126b that is operatively connected thereto and which may be secured relative to the crossbar 124 by a locking element 128a, 128b, respectively. The arms 126a, 126b are constructed and arranged to be operatively connected to a respective crossbar end, in a telescopic relation. Each arm 126a, 126b terminates in a rail contacting member 130a, 130b that operatively engages a rail 60, 62. Preferably, the contacting members 130a, 130b operatively engage the underside or bottom surface of a rail 60, 62, respectively. And preferably, the rail contacting member is a roller 132a, 132b. It should be understood, however, that the contacting members need not comprise moving parts, and they may be static, such as a layers of low friction material, for example. As mentioned above, movement and control of the deck 80 is facilitated by a plurality of rollers 94 that are carried by supports 90, 92 and which ride in channels 26, 30 formed in the tracks 24, 28 of the base 22 of frame 20 (see, FIGS. 4 and 7).

Movement of the deck relative to the frame is controlled in several aspects. First, overextension is prevented by static stops 38a, 38b that engage the forward beam 84 of the frame 82. Second, movement is controlled by a latch 102 that is mounted on the support 100 at pivot 104. The latch 102 is connected to a control rod 106 that extends towards and through the rearward beam 86 and terminates in a release bar 110. The release bar 110 is movable with respect to the rearward beam 86 and may be provided with one or more biasing elements 108 that urge the release bar 110 in a predetermined direction. Note that the ends of the release bar 110 may include adjustable nuts 118 so that the force exerted by the biasing elements 108 may be varied as desired. In order to facilitate operation of the release bar 110, the frame 82 is also provided with handles 112, 114. When the handles 112, 114 and the release bar 110 are gripped together, the control rod 106 rotates the latch 102 about pivot 104.

Referring now to FIG. 6, the configuration and operation of the latch 102 is depicted. The latch 102 has a curved edge or runner 103 and an inwardly extending notch 116. The edge 103 is configured to ride over the tiebeams of the base 22 as the deck 80 is extended or retracted relative to the frame 20. As the latch 102 is rotated upwardly about pivot 104, its motion is resisted by the biasing elements 108 via the release bar 110 and the control rod 106. Thus, when the deck 80 is in the correct position, the notch 116 of the latch 102 will automatically engage one of the tiebeams, and the deck 80 may be selectively secured to the frame 20 in one of several positions.

Figure 7:
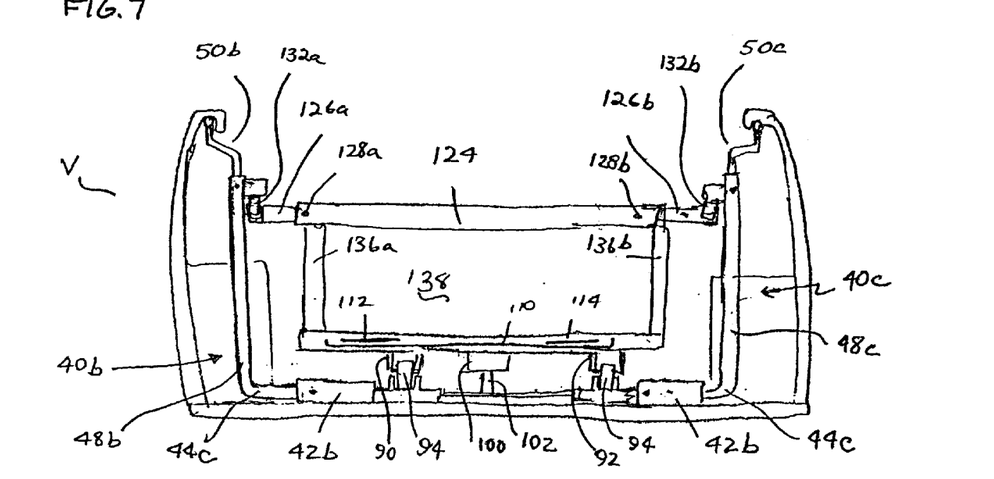
FIG. 7 is a partial, sectional view of a preferred embodiment of a load platform that has been installed on the cargo bed of a truck.

Referring now to FIG. 7, the juxtaposition between a load platform 10 and the cargo bed of a vehicle V can be seen. To install the load platform 10, the frame 20 is positioned so that the base 22 is perpendicular to the tailgate or loading end of the vehicle, and the forward stops 72, 74 of the rails 60, 62 are in contact with the front wall of the cargo box. The outriggers 40a, 40b, 40c, 40d, and the brackets 50a, 50b, 50c, 50d are then extended so that they are brought into engagement with, in a non-invasive manner, the containment walls around the cargo bed, and secured by locking elements. Preferably, the engagement members 56a, 56b, 56c, 56d of the brackets 50a, 50b, 50c, 50d are positioned so that they extend into the inverted channels that are formed by the inwardly extending horizontal ledges and the containment walls around the cargo bed. It will be appreciated that the brackets may be customized, if need be, to accommodate vehicles that have unconventional configurations. The deck 80, with its rail contacting members 130a, 130b retracted, is then installed so that it is coincident with the base 22 of the frame 20. The rail contacting members 130a, 130b are then extended so that they operatively engage the rails 60, 62 of the frame 20. The load platform 10 is now ready for use. Since the deck 80 of the load platform 10 is designed so that a portion of it may be extended, in a cantilever fashion, beyond the tailgate or loading end of a truck, it will be appreciated, then, that when the frame 20 is installed, the channels 26, 30 of tracks 24, 28 will be elevated with respect to the cargo bed and, when folded down, the tailgate. In order to present a level surface over which the deck may travel, the tailgate may be provided with an appropriately sized spacer pad that raises its level to that of the channel floor.

The present invention having thus been described, other modifications, alterations or substitutions may present themselves to those skilled in the art, all of which are within the spirit and scope of the present invention. It is therefore intended that the present invention be limited in scope only by the claims attached below:

What is claimed is:

1. A frame for supporting a deck of a load platform above a cargo bed of a truck of having a cargo bed with opposing side walls, the frame comprising:
   a base; and,
   at least one outrigger attached to the base, the outrigger having an end that is extensible away from the base, with the end of the outrigger configured and arranged to operatively interact with a portion of a truck body side wall in a non-invasive manner such that when the frame is installed in the cargo bed of the truck and the end of the outrigger is brought into engagement with the portion of the truck body side wall, the base is prevented from moving horizontally and vertically relative to the side wall, and when the outrigger is brought out of engagement with the portion of the truck body side wall, the base may move horizontally and vertically relative to the side wall.

2. The frame of claim 1, wherein there are at least two outriggers having ends that are extensible away from the base in opposite directions.

3. The frame of claim 1, wherein the end of the outrigger comprises a bracket.

4. The frame of claim 3, wherein the bracket is vertically adjustable.

5. The frame of claim 1, wherein the base comprises a track, the track constructed and arranged to movably support a deck on the frame.

6. The frame of claim 5, wherein the track further comprises a channel for guiding movement of the deck relative to the frame.

7. The frame of claim 5, further comprising a rail for constrainingly retaining a deck relative to the frame during movement therealong, with the rail operatively connected to the frame, and with the rail substantially parallel to the track.

8. The frame of claim 1, wherein said base further comprises a pair of tracks, with the tracks substantially parallel to each other.

9. The frame of claim 1, further comprising a first rail, with the first rail operatively connected to said frame.

10. The frame of claim 9, wherein the first rail further comprises an adjustable stop.

11. The frame of claim 9, further comprising a second rail, wherein the first and second rails are operatively connected to the frame in a spaced apart horizontal relation.

12. A load platform for use with a cargo bed of a vehicle, the load platform comprising:

an adjustable frame, the adjustable frame having at least one positionable member having an end that is extensible away from the frame, the end arranged and configured to operatively engage a portion of a containment wall of the vehicle adjacent the cargo bed of the vehicle in a non-invasive manner, such that when the adjustable frame is installed in the cargo bed of the vehicle and the end of the positionable member is bought into engagement with the portion of the containment wall of the vehicle, the adjustable frame is prevented from moving horizontally and vertically relative thereto, and when the positionable member is brought out of engagement with the portion of the containment wall, the adjustable frame may move horizontally and vertically relative thereto; and, a deck, with the deck operatively supported by the adjustable frame for constrained movement relative thereto.

13. The load platform of claim 12, wherein the adjustable frame further comprises a base, wherein the base supports the deck for movement in a constrained manner relative thereto.

14. The load platform of claim 12, wherein the adjustable frame further comprises a rail, with the rail operatively connected to the frame so that it is substantially parallel to and in alignment with the direction of constrained movement of the deck;

wherein the deck further comprises a contacting member, with the contacting member operatively connected to the deck and arranged to engage the rail;

whereby as the deck is moved relative to the frame, the contacting member engages the rail and the deck is prevented from tipping relative to the adjustable frame.

15. The load platform of claim 14, wherein the contacting member is a roller.

16. The load platform of claim 14, wherein the contacting member is adjustable relative to the deck.

17. The load platform of claim 14, wherein the contacting member is spaced from the surface of the deck.

18. The load platform of claim 14, wherein the rail has a bottom surface and wherein the contacting member engages the bottom surface thereof as the deck moves relative to the frame.

19. A load platform for use with a cargo box of a truck, the load platform comprising:

a frame, the frame comprising a base and a plurality of adjustable outriggers attached to the base, the outriggers having ends that are arranged and configured to engage opposed side walls of the cargo box in a non-invasive manner, such that when the frame is installed in the cargo box of the truck and the ends of the adjustable outriggers are brought into engagement with the opposed side walls of the cargo box the frame is prevented from moving horizontally and vertically relative thereto, and when the adjustable outriggers are brought out of engagement with the opposing side walls of the cargo box the frame may move horizontally and vertically relative thereto; and, a deck, with the deck supported by the frame and movable with respect thereto; wherein the deck may be shifted from a position substantially within the cargo box of the truck to a position partially extending out of the cargo box of the truck.

20. The load platform of claim 19, wherein the end of each adjustable outrigger further comprises a bracket.

21. The load platform of claim 20, wherein each bracket is adjustable.

22. The load platform of claim 12, further comprising a latch for selectively securing the deck relative to the frame in one of several positions.

23. A load platform in combination with a vehicle having a cargo bed with side walls, the load platform comprising:

an adjustable frame, the adjustable frame having positionable members with ends that are arranged and configured to operatively engage the side walls of the vehicle in a non-invasive manner, such that when the adjustable frame is installed in the cargo bed of the vehicle and the ends of the positionable members are brought into engagement with the side walls, the adjustable frame is prevented from moving horizontally and vertically relative thereto, and when the positionable members are brought out of engagement with the side walls, the adjustable frame may move horizontally and vertically relative thereto;

a deck, with the deck operatively supported and connected to the adjustable frame for constrained movement relative thereto, the deck movable between transport and access positions;

wherein the deck may be shifted from the transport position substantially within the cargo bed of the vehicle where it is substantially supported by the adjustable frame to the access position partially projecting out of the cargo bed of the vehicle where it partially extends beyond the adjustable frame, and wherein the deck is prevented from tipping relative to the adjustable frame as the deck is moved to its access position.

24. The frame of claim 1, wherein said end of the outrigger extends above the base.

25. A frame for supporting a deck of a load platform above a cargo bed of a truck, the frame comprising:

a base; and, at least one adjustable outrigger operatively connected to the base, the adjustable outrigger having an end that extends away from the base, with the end of the adjustable outrigger configured and arranged to engage an inwardly projecting portion of a truck body side wall in a non-invasive manner such that when the frame is installed in the cargo bed of the truck and the end of the adjustable outrigger is brought into engagement with the inwardly projecting portion of the truck body side wall, the base is prevented from moving horizontally and vertically relative thereto, and when the adjustable outrigger is brought out of engagement with the portion of the truck body, the base may move horizontally and vertically relative thereto.

26. A frame for supporting a deck of a load platform above a cargo bed of a truck, the frame comprising:

a base, the base configured and arranged to be self-supporting on the cargo bed of the truck; and, at least one adjustable outrigger attached to the base, the adjustable outrigger having an end that is extensible away from the base, with the end of the adjustable outrigger configured and arranged to engage a portion of a truck body in a non-invasive manner such that when the frame is installed in the cargo bed of the truck and the end of the adjustable outrigger is positioned into engagement with the portion of the truck body, the base of the frame is prevented from moving horizontally and vertically relative thereto, and when the adjustable outrigger is positioned out of engagement with the portion of the truck body, the base of the frame may move horizontally and vertically relative thereto.

27. The frame of claim 1, wherein the base comprises a track having a pair of vertically extending walls that form a channel therebetween.

28. The frame of claim 27, further comprising a first rail, with the first rail operatively connected to said frame, the first rail spaced apart from and substantially parallel to the channel of the track.

29. The frame of claim 1, wherein the base is configured and arranged so that it does not contact both of the opposed side walls of the cargo bed.

30. The load platform of claim 23, wherein at least one of the side walls of the vehicle has an inwardly projecting portion, and wherein at least one of the ends of the positional members is configured and arranged to engage the inwardly projecting portion from below.

* * * * *